United States Patent [19]
Ryan

[11] Patent Number: 5,196,705
[45] Date of Patent: Mar. 23, 1993

[54] SUN EXPOSURE MONITORING DEVICE

[75] Inventor: Paul T. Ryan, Cambridge, Great Britain

[73] Assignee: Saitek Limited, Kowloon, Hong Kong

[21] Appl. No.: 761,365

[22] PCT Filed: Feb. 23, 1990

[86] PCT No.: PCT/GB90/00290
§ 371 Date: Aug. 23, 1991
§ 102(e) Date: Aug. 23, 1991

[87] PCT Pub. No.: WO90/10201
PCT Pub. Date: Sep. 7, 1990

[30] Foreign Application Priority Data
Feb. 24, 1989 [GB] United Kingdom ............... 8904314

[51] Int. Cl.⁵ ............................................. G01J 1/58
[52] U.S. Cl. .................................. 250/372; 250/458.1
[58] Field of Search ............... 250/372, 461.1, 458.1, 250/365

[56] References Cited
U.S. PATENT DOCUMENTS
4,096,387 6/1978 Buckley .
4,262,206 4/1981 Viehmann ..................... 250/483.1
4,935,631 6/1990 Mosley et al. ..................... 250/372

FOREIGN PATENT DOCUMENTS
WO88/04414 6/1988 PCT Int'l Appl. .
88/06279 8/1988 PCT Int'l Appl. .
2200987A 8/1988 United Kingdom .

Primary Examiner—Janice A. Howell
Assistant Examiner—Richard Hanig
Attorney, Agent, or Firm—Townsend and Townsend

[57] ABSTRACT

A sun monitoring device has a sensing sheet mounted in a housing to receive incident sunlight through a UV pass filter. The sheet contains a dye which luminesces in response to the incident light in a wavelength range within the UV range, and emits light within the sheet at longer wavelengths. The emitted light is internally reflected in the sheet and emerges at the edge of the sheet. A sensor is disposed to receive such light emerging from a portion of the sheet edge and generate signals in response thereto. Computing means is coupled to the sensor to determine from these signals the power of incident UV light on the sensing sheet in the selected wavelength range.

21 Claims, 3 Drawing Sheets

SUN EXPOSURE MONITORING DEVICE

This invention relates to the monitoring of exposure to sunlight, and is particularly directed at the provision of a device which measures the power of incident sunlight. It is intended for use by sunbathers to assist in monitoring safe exposure levels, and thereby minimise damage to the skin.

The human skin responds to incident sunlight by turning red (erythema), developing a tan (melanogenesis) and developing cancers. This invention makes no reference to carcinogenic effects, and is primarily concerned with the development of erythema. Exposure to ultraviolet light, principally in the region 280-400 mm causes erythema, the visible effects of which normally become apparent around 8 hours after exposure, and which peaks around 72 hours after exposure. Although the sensitivity of normal skin to ultraviolet in this wavelength range varies widely, an international standard for this sensitivity has been proposed. This is based on the concept of a minimum erythemal dose (MED); i.e., the dose that is sufficient to provoke perceptible reddening, or erythema, and is described in a research note published in the CIE Journal Vol 6 Number 1 of 1987, on pages 17-22. The standard is referred to as the relative erythemal action spectrum, and is tabulated as follows;

| Wavelength nm | Erythemal effectiveness Relative |
|---|---|
| 250-298 | 1.0 |
| 300 | 0.65 |
| 310 | 0.074 |
| 320 | 0.0086 |
| 330 | 0.0014 |
| 340 | 9.7e-4 |
| 350 | 6.8e-4 |
| 360 | 4.8e-4 |
| 370 | 3.4e-4 |
| 380 | 2.4e-4 |
| 390 | 1.7e-4 |
| 400 | 1.2e-4 |

The above table assumes a uniform erythemal sensitivity to ultraviolet light in the wavelength range 250-298. The reasons for this are discussed in the research note referred to above. The figures given are based on research on untanned white torso skin, and for the skin type that was the basis of the table the MED is calculated to be 200-400 Joules/$m^2$ at a wavelength of 300 nm. The sensitivity at other wavelengths can be found by dividing this figure by the entries in the table. The table thus enables the generation of a relative erythemal action spectrum, and this is shown in the note on page 20 of the CIE journal. Other skin types will have different MEDs, and it should be recognised that the MED of a particular individual can be effected by a number of external factors. Particularly, after recovery from a first exposure, a given skin type can more readily tolerate an increased second dose of exposure.

An equivalent tabulation for sensitivity to tanning (melanogenesis) is believed to be broadly similar. It is understood that the principal difference is a greater tanning sensitivity at longer wavelengths.

The present invention is concerned with the measurement of the power of natural sunlight in circumstances where burning is likely. Because of the relatively low power of erythemally active ultraviolet light in relation to the power at nearby and other wavelengths, accurate measurement is difficult. Various devices have been developed to isolate and measure the power of the ultraviolet content in sunlight, but with varying degrees of success. Generally, these devices employ one or more filters, and either measure the power of ultraviolet transmission through an UV pass filter, or calculate a power measurement by subtracting the power generated from a transmission through an UV stop filter from a power measurement from unfiltered light. The advantage of the latter technique is that UV stop filters are less expensive than UV pass filters. Reference is also directed to International Patent publication No. WO88/06279 in which a radiation detector is disclosed comprising a photoluminescent element of thin section. While this detector can monitor radiation received by the element, it cannot discriminate between higher and lower risks of burning. In each case, power measurement is usually accomplished using a photosensor such as a photodiode. They can be adapted to measure an instantaneous power level, or integrated to give a measurement of dose. The intention of course, is to develop a device whose sensitivity spectrum accurately matches that of skin.

The present invention is directed at a sun exposure monitoring device in which the ultraviolet fraction of incident sunlight is used to cause a dye to luminesce in a manner which enables a power measurement to be made. The dye is included in a sheet of material or film which is exposed to incident sunlight. An ultraviolet pass filter may be disposed adjacent thereto through which incident sunlight is filtered before impinging on the sheet containing the dye. It is also possible to incorporate a filtering medium in the sheet or film to block or absorb light outside the ultraviolet range.

The dye is selected so as to luminesce in response to incident ultraviolet light within a wavelength range which is itself within the ultraviolet range. Dyes useful in the invention preferably fluoresce in response to UV light in the wavelength range 250 to 400 nanometers. However, UV light in the range 290 to 340 nanometers is of greater significance. What are particularly preferred are dyes which luminesce only in response to wavelengths up to 330 nanometers. UV light of higher wavelengths is less damaging to the skin, and when the power of such higher wavelength light is included in the eventual measurement, the measurement is less truly representative of the accumulative risk of burning. Some response at shorter wavelengths is also desirable, and those dyes which fluoresce in response to Uv light of wavelengths as short as 250 nanometers are especially preferred. The luminescence of the dye is at wavelengths longer than those of the incident light, and the selection of the dye and the sheet of the material is such that the emitted light reflects internally between the faces of the sheet, and emerges at the edges thereof. A sensor is disposed to receive light emerging at the edge of the sheet, and the light received used to calculate the power of the ultraviolet light in the selected wavelength range incident on the device. By exploiting edge emission of the luminescence the measured energy is at a higher brightness than is available in a simple filter arrangement. This enables the use of a lower quality sensor with a substantial cost saving. Because the luminescence is at longer wavelengths than the activating ultraviolet light, the sheet is more transmissive of such radiation, thereby further enhancing the brightness of the edge emission and the response of the sensor.

Normally the sensor is a photo-electric sensor, such as a photodiode, a light dependant resistor, a photocell or a vacuum photocell, and the electrical signal generated thereby provides an indication of the power of the incident ultraviolet light. It is also possible to interpose a second stage of luminescence or an ultraviolet pass filter between the sheet and the photosensor. For example, the light emitted from the sheet could be received in a collector which itself includes a luminescent substance, the emission from which is measured by the photosensor. It is possible also to use a "solar blind" photosensor which is responsive only to light in the selected wavelength area. This avoids the need for a filtering mechanism, but is an expensive option.

The selection of the dye and its incorporation in the sheet of material is of course of critical importance. The dye, its concentration in the sheet of film, and the film or sheet thickness can be selected to achieve a luminescence action spectrum that closely matches the relative erythemal action spectrum shown in the research note discussed above. The electronics associated with the light sensor can be calibrated to provide accurate indications of safe exposure levels for given skin types relative to MED over a short period of time. The geometry of the plastic sheet and the disposition of the UV pass filter if used, can be such that incident light at other wavelengths is substantially ignored. Essentially, the UV pass filter will block most of the incident light at wavelengths outside the ultraviolet range, and light which passes through the filter but is not within the wavelength range to which the dye is responsive will pass directly through the sheet. Thus the amount of scattered light received by the photosensor is minimised.

The material of the sheet might be any suitable transparent medium, and the sheet might comprise one layer with the dye disposed on one face, or two layers of transparent material with the dye disposed therebetween. The preferred medium is a plastics material, and it is also preferred to uniformly distribute the dye in the sheet. Suitable plastics materials are polymethylemethacrylate (acrylic), such as are sold under the registered Trade Mark PERSPEX. As a general guide, the dye may be distributed in the sheet material in an amount in the range 0.02–0.4 grams per liter of sheet material, in a sheet material of up to 2.5 mm thickness.

In selecting a suitable dye, the following criteria should be considered;

1. Its compatibility with plastics materials (for uniform distribution therein)
2. Its activation spectrum shape should match as close as possible the erythemal action spectrum, with particular reference to wavelength and steepness in the ultraviolet range.
3. Its quantum yield should be as high as possible, preferably at least 0.4.
4. The Stoke's shift (the difference between the activation and emission wavelengths) should be high.
5. Its tendency to bleach (reversibly or otherwise) should be minimum.

With the above criteria in mind, we have found that organic dyes are most suitable, the preferred dyes being aromatic hydrocarbons. Fluorene, methyl fluorene and para terphenyl have suitable characteristics and para terphenyl in a concentration of 0.04 grams per liter in a 1 mm film has been found to be satisfactory. Para terphenyl luminesces in response to UV light generally in the wavelength range 200 to 300 nanometers and when dispersed in a plastics film its response to the larger wavelengths in this range is enhanced.

Suitable UV pass filters are Schott glass type UG 11 and Hoya U340 which pass UVB in the 300–400 nm range and has a peak transmission close to 300 nm.

In order to minimise scatter and the transmission of undesirable light to the photosensor, devices according to the invention will preferably incorporate one or more shields to block light which might otherwise be transmitted to the sheet at high angles of incidence. Similarly, one or more shields may be disposed on the opposite side of the sheet of material to prevent light which has been transmitted through both the filter and the sheet from being reflected back onto the sheet. The incident shield is preferably of the honeycomb type, with the walls thereof having a light absorptive coating. A similar form of shield may be used on the opposite side of the sheet, but the walls can alternatively be convergent so that any extraneous light is absorbed. The "output" shield might also take the form of a plurality of conical absorbers.

It is also preferred to include one or more mode strippers for reducing the light propagating to the sensor in high order reflection modes. Such a mode stripper typically comprises a light absorbtive material on either side of the sensing sheet proximate the sensor, preferably in direct contact therewith. The material might be cast directly onto the sheet to achieve intimate optical contact therewith. Alternatively, a transparent layer might be interposed between the material and the respective faces of the sheet.

Another way of reducing high order reflection modes in the sensing sheet is to bend it between the exposed section and the sensor. This results in the internally reflecting rays encountering higher angles of incidence, and higher order modes therefore escaping.

The invention will now be described by way of example and with reference to the accompanying schematic drawings wherein.

Figure 1:
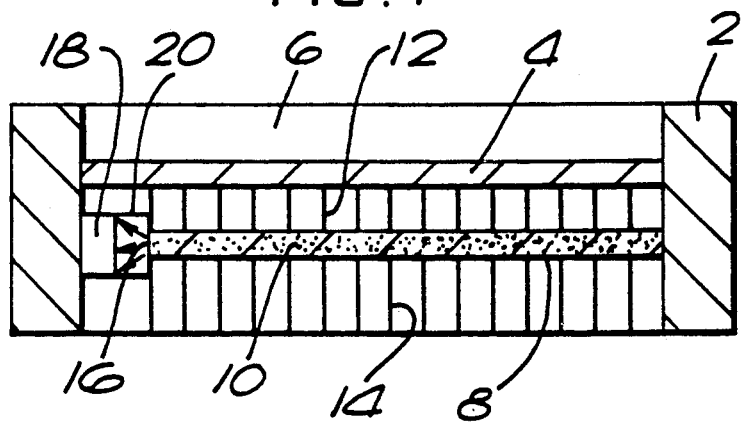
FIG. 1 shows a cross section through a device embodying the invention.

The device shown in FIG. 1 comprises a frame 2, across which is suspended an ultraviolet pass filter 4. The filter 4 is spaced from the upper boundary of the frame 2 such that it forms the base of a recess 6 therein. Beneath the filter 4 is mounted a sensing sheet 8. Both the filter 4 and the sheet 8 have substantially parallel flat faces, and each has a thickness in the range 1.0 to 2.0 mm. Normally, the thickness of each sheet is around 1 mm.

Uniformly dispersed within the sensing sheet 8 is a luminescent dye 10 which is responsive to incident ultraviolet radiation in a specified wavelength range to luminesce with light at longer wavelengths. Between the filter 4 and the sensing sheet 8 is disposed a honeycomb type structure with parallel walls 12 which extend substantially perpendicularly to the planes of the filter 4 and sheet 8. A similar honeycomb structure is disposed beneath the sensing sheet 8 with walls 14 which extends to the lower boundary of the frame 2. The walls 12 and 14 each bear a light absorbtive coating such as matte black. Thus, light received at high angles of incidence and transmitted through the filter 4 is absorbed by the walls 12, and do not reach the sensing sheet 8. Light which has passed through the filter 4 to the sheet 8, but which is not absorbed by the dye 10 is similarly transmitted directly from the sheet 8 or absorbed by the walls 14. The honeycomb structure comprising the walls 14 may be replaced by an array of conical absorbers which have the further benefit of preventing the passage of light onto the sheet 8 from the underside, while fully absorbing any light transmitted through the sheet 8.

With the upper face of the device illustrated exposed to sunlight, light of wavelengths outside the ultraviolet range is stopped by the pass filter 4, and the ultraviolet light content transmitted to the sensing sheet 8. This ultraviolet light impinges on the dye 10 in the sheet 8 causing the dye 10 to luminesce. The dye 10 is selected to luminesce only in response to ultraviolet light in a narrow range of frequencies within the ultraviolet range as described above. Light at other wavelengths that has passed through the filter 4 is transmitted directly through the sheet 8 and past the walls 14 or absorbed as described above. The dye 10 luminesces at wavelengths longer than those of the radiation to which it has responded. The planar faces of the sheet 8 are polished such that light at these longer wavelengths is internally reflected within the sheet 8 and emitted mainly at the edges.

Disposed adjacent a portion of one edge 16 of the sheet 8 is a photodiode 18 which receives the light emitted at the edge 16 and generates an electrical signal in response thereto. This electrical signal is representative of the power of the ultraviolet radiation that has excited the dye 10, and is thus also representative of the sunburning power of the sunlight to which the device is exposed. This electrical signal can be fed to an electronic circuit or a small computer to provide a range of information to the user. For example, the computer can generate a numerical and/or graphic display, or an audible or visible signal indicative of the current power of the incident sunlight, the accumulated power of sunlight that has been received by the device, or an indication of the safety of the user in further exposure relative to predetermined safety levels. The computer can further take account of ambient conditions and the time of day in predicting a safe further exposure time, bearing in mind that in a cloudless sky the intensity of the sunlight received will vary during the course of the day. Provision may also be made for adjusting the computer to take account of a skin sensitivity factor, adjustable for a particular user and for any additional protection factors such as those consequential upon the use of sun lotion.

From the above it will be appreciated that the ingress of stray light into the device and particularly into the diode must be minimised. Accordingly, to protect the diode from such extraneous light, a cowling 20 may be included which extends from the diode to the proximal walls 12, 14 of the respective honeycomb structure shields. By aligning these proximal walls with the edge of the sheet, passage of extraneous light to the diode 18 is substantially eliminated.

The geometry of a device according to the invention can make it very sensitive to light at the critical wavelengths and insensitive at other wavelengths. A relatively large area of the sensing sheet 8 can be used, and as a result of the internal reflection of emitted light within the sheet, the luminescence or fluorescence is concentrated onto the relatively small area of the edge of the sheet to which the photodiode is exposed. In this respect it should be understood that the photodiode does not have to receive all the light emitted by the dye, but can be located adjacent only a portion of the edge of the sheet, and the computer to which it is linked be calibrated accordingly. While the sheet could be shaped, and some of the edges polished to achieve internal reflection there also and concentrate the emission to a very small edge portion of the sheet, this is not felt to be necessary.

In a typical device according to the invention, a sheet of thickness around 1 mm and having an area of around 120 mm$^2$ has the dye para terphenyl uniformly distributed therein at a concentration of 0.04 grammes per liter. The sheet can be rectangular in shape, for example 8 mm by 15 mm, with a 5 mm photodiode disposed to receive light emitted from the dye along the shorter edge thereof.

The ultraviolet pass filter in devices according to the invention might be omitted if the sensing sheet 8 can ensure only a minimal amount of scattering of light outside the selected wavelengths. In general though, we have found the use of the filter essential when using currently available materials. It is more likely that the UV pass filter is inadequate because of the high level of scattering, and where this is the case a second, smaller, sensor may be used to give an estimate of the amount of scattering that is likely. The calculation by the computer can then deduct a proportion of the output from the second sensor from that of the main sensor. Such a second sensor could be a second photodiode disposed behind the UV pass filter, or could use a separate sensing sheet. In other words, the second sensor could be a device essentially similar to the first with the essential difference that the dye is omitted from the second.

While the embodiments of the invention described above uses a dye uniformly dispersed within a sensing sheet 8 and the material of the sensing sheet 8 is a substantially homogeneous material such as a PERSPEX sheet, other means might be used for housing the dye. For example, liquid or gaseous media might be used or dye coated on the surface of a solid substrate. Such a substrate might be glass, but glass is not readily suitable for use in combination with organic dyes, which we have found to give the best results.

As noted above, it can be desirable to restrict the angles of incidence at which light can impinge upon the sensing sheet or film 8. Particularly, the admission of light at high angles of incidence can result in excessive light entering the sheet of film and being received by the sensor, resulting in an inaccurate reading. The admitted light can be restricted by collimating the light using baffles or a shield as described above, but this can result in a sensing device which has too narrow an acceptance angle and cannot therefore ideally represent the sensitivity of skin in the circumstances contemplated. Other possible techniques are illustrated in FIGS. 2 to 9.

Figure 2:
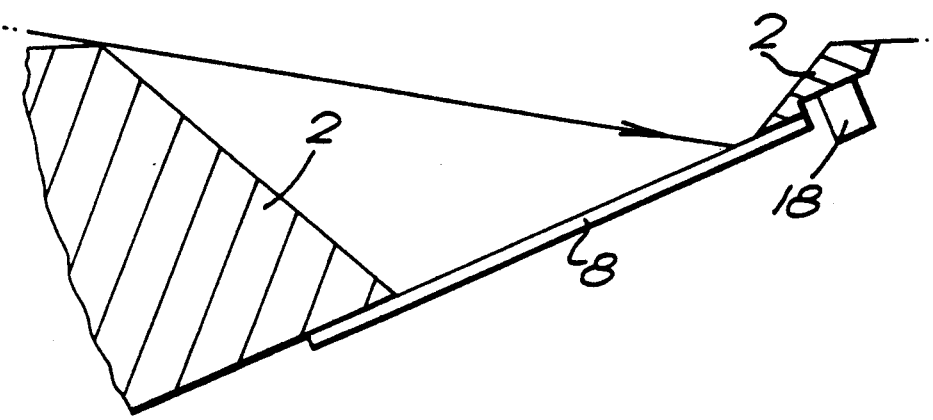
FIGS. 2 to 6 illustrate some modifications to devices according to the invention which can be effective to reduce the amount of extraneous light.

In FIG. 2, the plane of the sheet or film 8 is canted in the housing 2. As a result the sheet has a usable acceptance angle, within which excess light does not enter the film, which is not symmetrical relative to the sensor 8. Only high incidence angle light directed towards the sensor causes inaccuracies, and thus light received by the sheet from the right as shown in FIG. 2 at high incidence angles, if it is not reflected at the surface, is internally reflected in the sheet and eventually emitted at the left edge without influencing the sensor 18. Canting the sheet orients the useful acceptance angle so that it is asymmetrical with respect to the housing, giving a closer match to skin characteristics.

Figure 3:
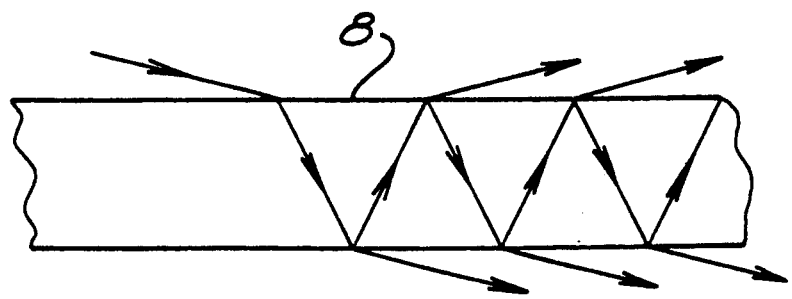
Figure 4:
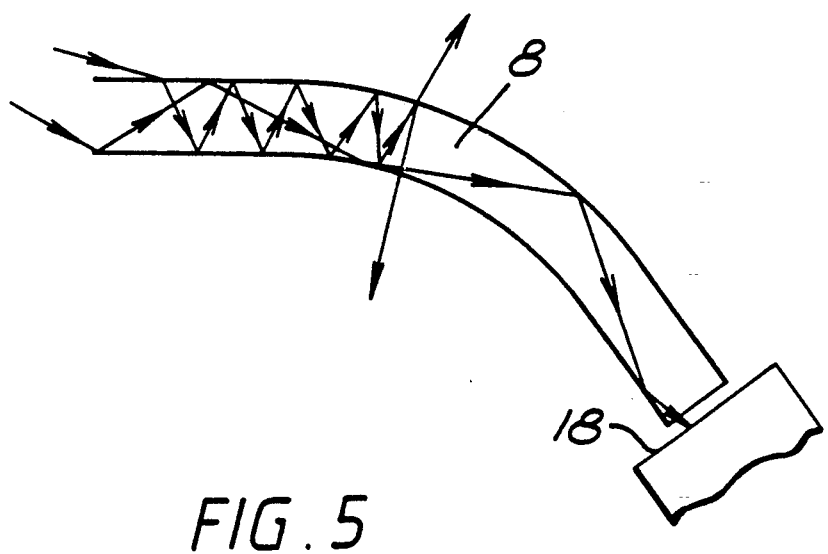
Figure 5:
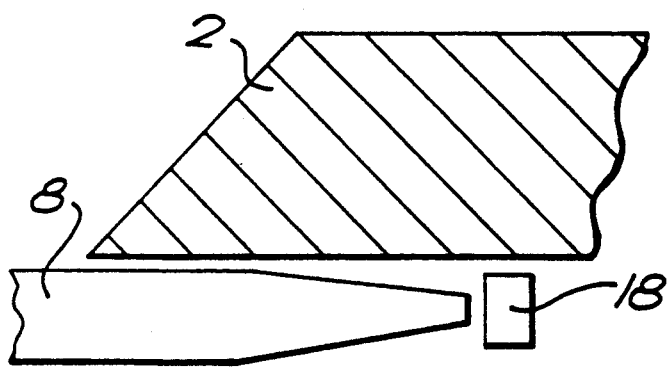

High order reflection modes within the sheet or film 8 can also be removed by the use of thin film and/or the creation of curvature(s) in the film or sheet. When light enters the film or sheet from an high incidence angle, it reflects within the sheet at angles around the critical angle, as shown in FIG. 3. At each reflection, a proportion of this light escapes. If the light undergoes a large number of reflections then these high order reflection modes, as they are known, preferentially escape. This can be arranged by making the length of sheet between the exposed area and the sensor long in comparison to its thickness. In a compact product this would necessitate a thin plastic film. An improvement can be made by forming one or more bends or areas of curvature in the sheet or film between the exposed area and the sensor 18 as shown in FIG. 4. The effect of this is that internally reflecting rays encounter higher angles of incidence, so higher order modes preferentially escape. A similar effect is achieved by the use of a tapered sheet between the exposed area and the sensor 18 as shown in FIG. 5. The effect is that internally reflecting rays experience an increased angle of incidence, so preferentially allowing the high order modes to escape.

Figure 6:
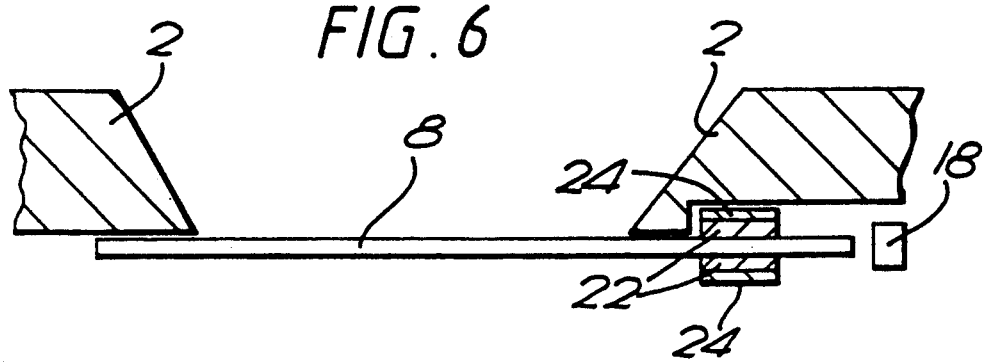

Another way of reducing high order reflection modes is to use a mode-stripping band. Light internally reflects within the sheet or film by virtue of the difference in refractive index of the sheet and the surroundings. As shown in FIG. 6, light from an high incidence angle internally reflects within the sheet at angles close to the critical angle. Between the exposed area of the sheet 8 and the sensor 18 is a region coated in a transparent material 22 of refractive index between that of the sheet and that of air. Within this region, the critical angle is increased so that the light from high order incidence can escape into the material 22. This is backed by layers 24 of absorbing material which prevents the light from reflecting back into the film. If the coatings 22 are thick enough, the absorbing layers 24 may be unnecessary as the light will escape directly from the layers 22, leaving little to remain in the sheet.

Figure 7:
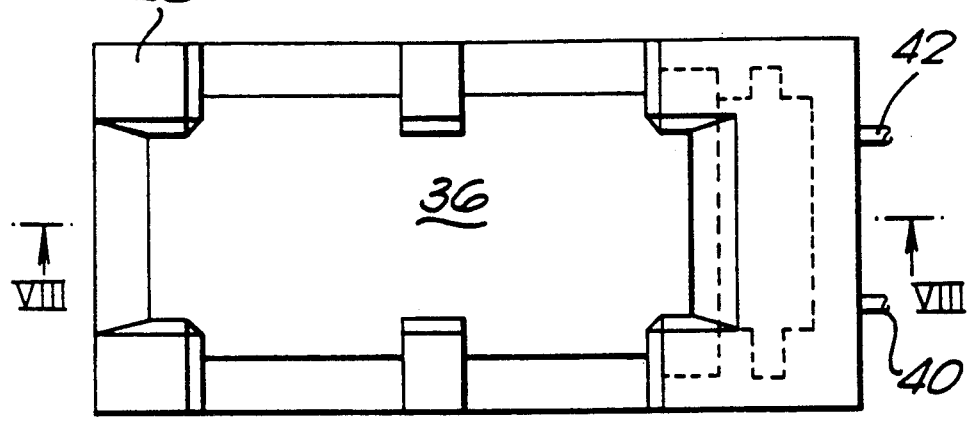
FIG. 7 is a plan view of another embodiment of the invention.
Figure 8:
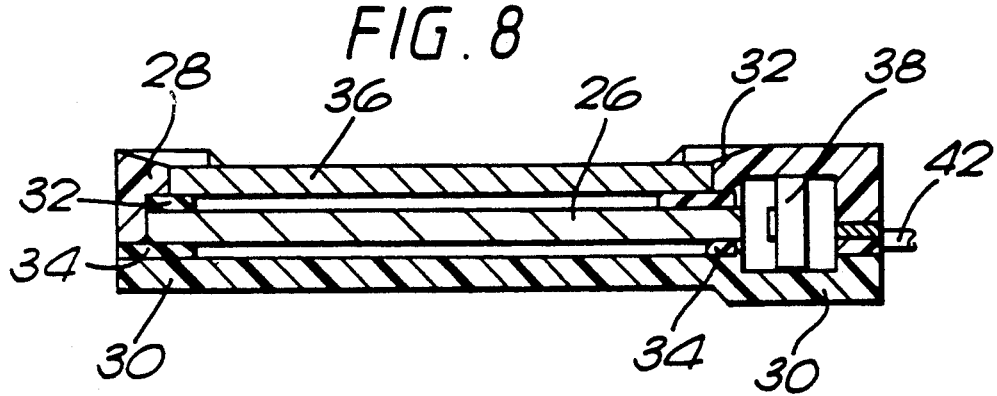
FIG. 8 is a section taken on line VIII—VIII of FIG. 7.

FIGS. 7 and 8 show another use of mode strippers in a device of the invention. The device shown has a sensing sheet 26 held in a frame or housing comprising upper and lower plastics mouldings 28, 30, by gaskets 32, 34. An UV pass filter 36 is held between the upper moulding 28 and the upper gasket 32. A photodiode 38 is also mounted in the housing to receive light emitted from the edge of the sheet broadly as described above with reference to FIG. 1. The signals from the photodiode 38 are processed in a computer (not shown) to deliver a warning or other indication of exposure either to a display unit (not shown) on the device or along a cable 42 to another monitoring system.

The gaskets 32 and 34 are formed of a light absorptive material such as a silicone rubber. Any soft black material will suffice provided it is compatible with the material of the sensing sheet 26 and can make good optical contact therewith. Another suitable material can comprise a thermoplastic elastomer and excess plasticizer to ensure conformability with the sensing sheet. Gaskets formed of these materials act as effective mode strippers. Light at high order reflection modes within the sensing sheet will be absorbed by the gaskets 32, 34 before reaching the photodiode 36 and corrupting the signal generated thereby.

The gaskets 32, 34 may be separate components laid or adhered in place on the housing or sensing sheet. Good physical and optical contact with the sensing sheet is important, particularly in the regions adjacent the photodiode 36, and a preferred way of ensuring this is to cast the gaskets directly onto the sensing sheet. It will be noted that the gasket 32 extends over the sensing sheet beyond the gasket 34 in the region of the photodiode 36. This is to avoid light passing through the sensing sheet 26 impinging directly on the surface of gasket 34 and thereby causing excess scattering of light into the sheet 26.

Figure 9:
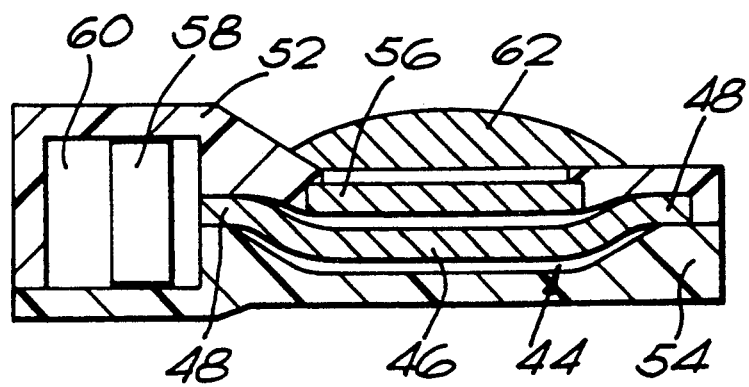
FIG. 9 is a cross-section through an embodiment of the invention incorporating the modification of FIG. 4.

FIG. 9 shows how high order reflection modes in the sensing sheet of a device according to the invention can be reduced by bending the sensing sheet in the manner described above with reference to FIG. 4. In FIG. 9, a sensing sheet 44 has its central portion 46 displaced from its peripheral portion 48 such that it is in the form of a dish, with two continuous and opposite lines of curvature between the portions whereby portions are in substantially parallel planes. As described above with reference to FIG. 4, these dual lines of curvature allow the preferential escape of high order reflection modes from both faces of the sheet 44. Of course the sensor 50 is disposed only to receive light emitted from a relatively small section of the edge of the sensing sheet 44, and it is not therefore essential to form the lines of curvature continuously around the sheet. However, as will be apparent from FIG. 9, a dished sensing sheet of the kind shown can also minimise the impact of light impinging on the sensing sheet at high angles of incidence, and this form is therefore preferred.

As with the device of FIGS. 7 and 8, the construction of the device shown in FIG. 9 includes upper and lower plastics mouldings 52, 54 between which the sensing sheet 44 is held, and which also supports an UV pass filter 56. A photodiode or other sensor 58 is housed in the cavity 60 between the mouldings 52, 54. Gaskets (not shown) will usually be included to hold the various components of the device in place.

FIG. 9 also shows the use of light collimator 62 over the filter 56 to exclude light from impinging at high angles of incidence. A matte surface on the filter 56 can have a similar effect.

In another variant of the invention, the light emitted from the edge of the sensing sheet 8 may be received in a second medium in which another luminescent dye is confined. This can be used if the emission from a longer length of the edge of the sheet is to be measured. This medium could be in the form of an elongate element in which the second stage of luminescence is internally reflected and emitted preferentially at the relatively small end thereof. This technique increases the amount of light being monitored, and therefore increases the sensitivity of the device. This benefit is of course balanced by the disadvantage of having an additional transmission of light from one medium to another which might reduce the ultimate efficiency.

Devices embodying the invention can be adjustable for a particular level of skin sensitivity. Such adjustment can be within the computer or other means used to interpret the signals from the sensor. Alternatively, the area of the sensing sheet which is exposed to incident sunlight can be adjusted by a shield movable thereover.

By reducing the exposed area, so is the emission from the dye in the sensing sheet reduced and hence the light received by the sensor. A mechanism for achieving this can include a screen movable over the sensing sheet or filter, and the device can be marked to indicate suitable settings for the screen relative to skin sensitivity.

Various optional features of the invention are described separately above. It should though, be appreciated that they can if desired be used in combination on the same device.

I claim:

1. A sun exposure monitoring device comprising a sensing sheet mounted in a housing with an exposed face thereof adapted to receive incident sunlight, the sensing sheet including a dye which luminesces in response to incident ultraviolet light in a selected wavelength range within the ultraviolet range to emit light at longer wavelengths, light so emitted preferentially reflecting internally between the faces of the sheet and emerging at the edges thereof; a sensor disposed in the housing adjacent an edge portion of the sheet to receive light emerging therefrom; means for reducing the light propagating to the sensor in high order reflection modes; and means connected to the sensor for determining the power of incident ultraviolet light in the selected wavelength range on the sheet from signals generated by the sensor.

2. A device according to claim 1 wherein the selected wavelength range is 250 to 330 nanometers.

3. A device according to claim 1 including an ultraviolet pass filter disposed over the sensing sheet.

4. A device according to claim 1 including a filtering medium in the sensing sheet for blocking or absorbing light outside the ultraviolet range.

5. A device according to claim 1 wherein the sensor is responsive only to light in the selected wavelength range.

6. A device according to claim 1 wherein the dye is substantially uniformly dispersed in the sensing sheet.

7. A device according to claim 1 wherein the sensing sheet is formed in a plastics material.

8. A device according to claim 6 wherein the dye is an aromatic hydrocarbon.

9. A device according to claim 8 wherein the sensing sheet comprises an acrylic sheet with para terphenyl dispersed therein at a concentration of substantially 0.04 grammes per liter.

10. A device according to claim 1 including shields for protecting the sensing sheet from light impinging on the sheet at high angles of incidence.

11. A device according to claim 1 wherein the reducing means is a mode stripper comprising a light absorptive material on either face of the sensing sheet.

12. A device according to claim 11 wherein the light absorptive material is in direct optical contact with the sensing sheet.

13. A device according to claim 11 wherein the light absorptive material is cast directly on the sensing sheet to achieve intimate optical contact therewith.

14. A device according to claim 11 including a transparent layer between the light absorptive material and the respective faces of the sensing sheet.

15. A device according to claim 1 wherein the sheet is formed with at least one bend between the exposed face and the sensor for reducing high order reflection modes in the sheet.

16. A device according to claim 1 including a light collimator over the exposed face of the sensing sheet.

17. A device according to claim 1 wherein the exposed face of the sensing sheet has a matte finish.

18. A device according to claim 1 including means for adjusting the area of the sensing sheet directly exposed to incident sunlight.

19. A sun exposure monitoring device comprising an acrylic sensing sheet mounted in a housing with an exposed face thereof adapted to receive incident sunlight, the sensing sheet including para terphenyl substantially uniformly dispersed in the sheet at a concentration of substantially 0.04 grammes per liter, which para terphenyl luminesces in response to incident ultraviolet light in a selected wavelength range within the ultraviolet range to emit light at longer wavelengths, light so emitted preferentially reflecting internally between the faces of the sheet and emerging at the edges thereof; a sensor disposed in the housing adjacent an edge portion of the sheet to receive light emerging therefrom; and means connected to the sensor for determining the power of incident ultraviolet light in the selected wavelength range on the sheet from signals generated by the sensor.

20. A sun exposure monitoring device comprising a sensing sheet mounted in a housing with a light filtering means over an exposed face thereof adapted to receive incident sunlight through the filtering means, the sensing sheet including a dye dispersed therein which luminesces in response to incident ultraviolet light in a selected wavelength range within the ultraviolet range to emit light at longer wavelengths, light so emitted preferentially reflecting internally between the faces of the sheet and emerging at the edges thereof, a sensor disposed in the housing adjacent an edge portion of the sheet to receive light emerging therefrom, and means connected to the sensor for determining the power of incident ultraviolet light in the selected wavelength range on the sheet from signals generated by the sensor, and the filtering means comprising an optical sheet adapted to transmit the ultraviolet light and to obscure light within the visible range of wavelengths, said optical sheet being spaced from the sensing sheet, and means between said optical sheet and the sensing means permitting only substantially perpendicular incident rays impinging the sensing sheet.

21. A sun exposure monitoring device comprising a sensing sheet mounted in a housing with an exposed face thereof adapted to receive incident sunlight, and means for adjusting the area of the sensing sheet directly exposed thereto, the sensing sheet including a dye which luminesces in response to incident ultraviolet light in a selected wavelength range within the ultraviolet range to emit light at longer wavelengths, light so emitted preferentially reflecting internally between the faces of the sheet and emerging at the edges thereof; a sensor disposed in the housing adjacent an edge portion of the sheet to receive light emerging therefrom; and means connected to the sensor for determining the power of incident ultraviolet light in the selected wavelength range on the sheet from signals generated by the sensor.

* * * * *